June 2, 1953 — L. D. BARRY — 2,640,612
PORTABLE HOIST
Filed May 26, 1949 — 6 Sheets-Sheet 2
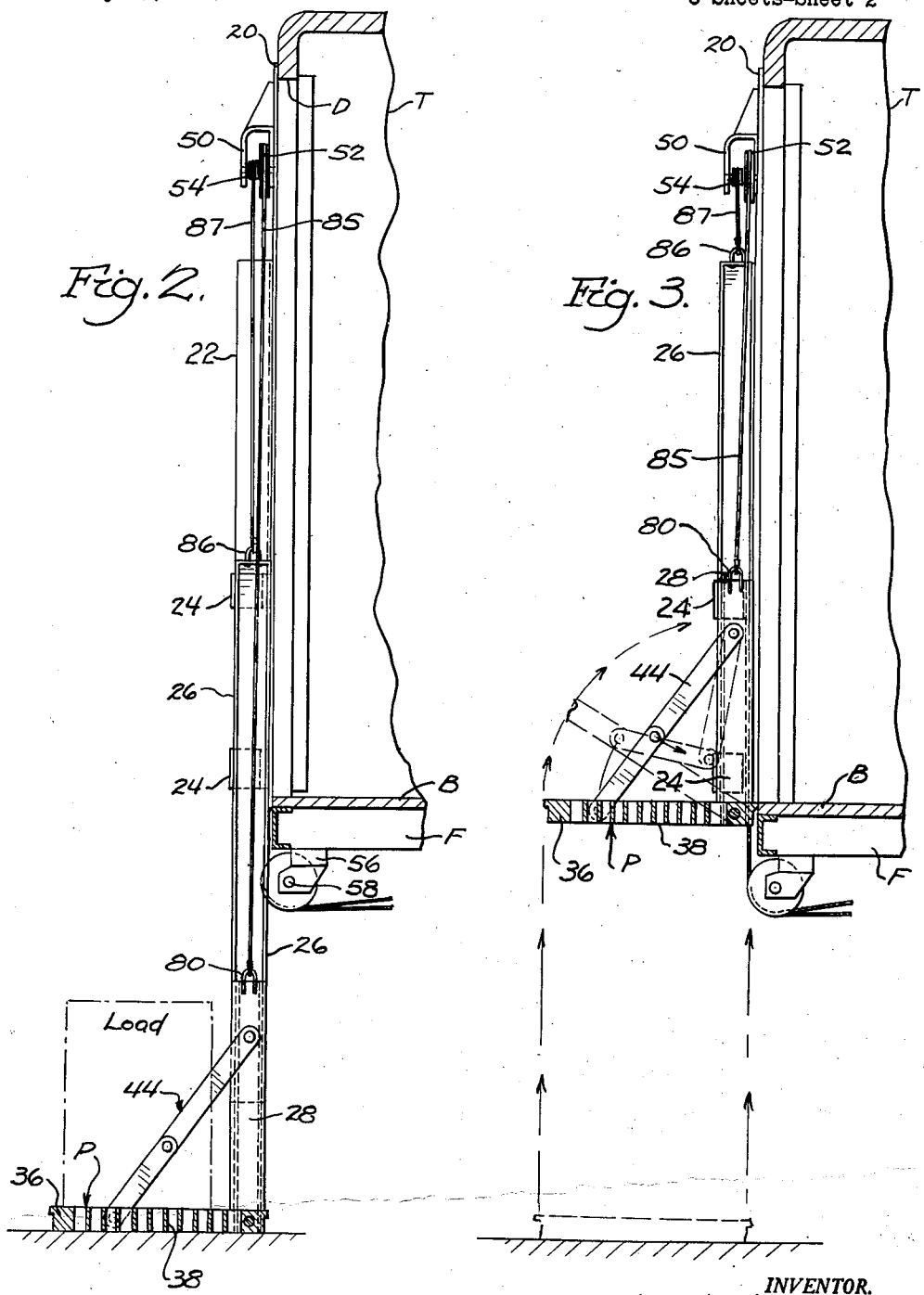
INVENTOR.
Leonard D. Barry
BY
Barnes, Kisselle, Laughlin & Raisch
Attorneys.

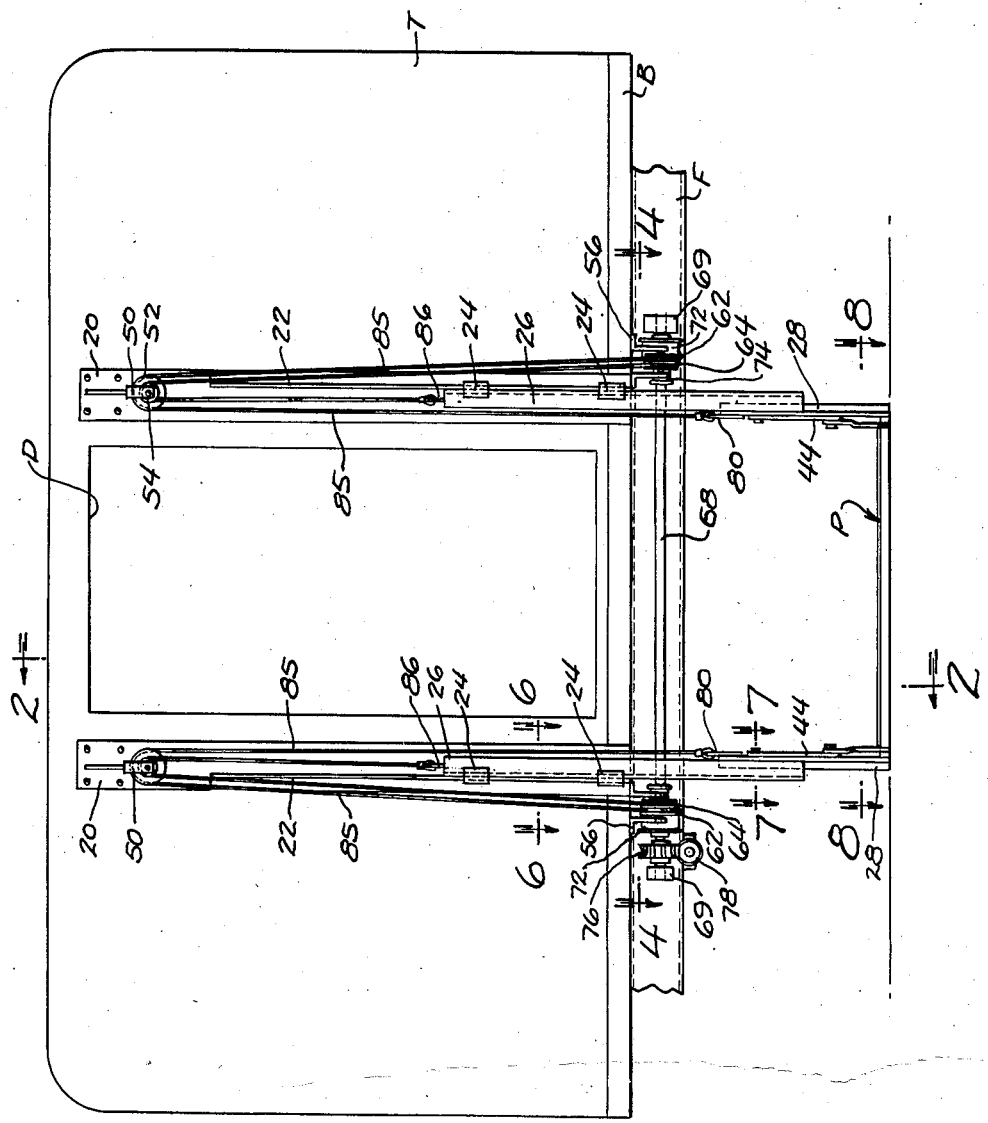

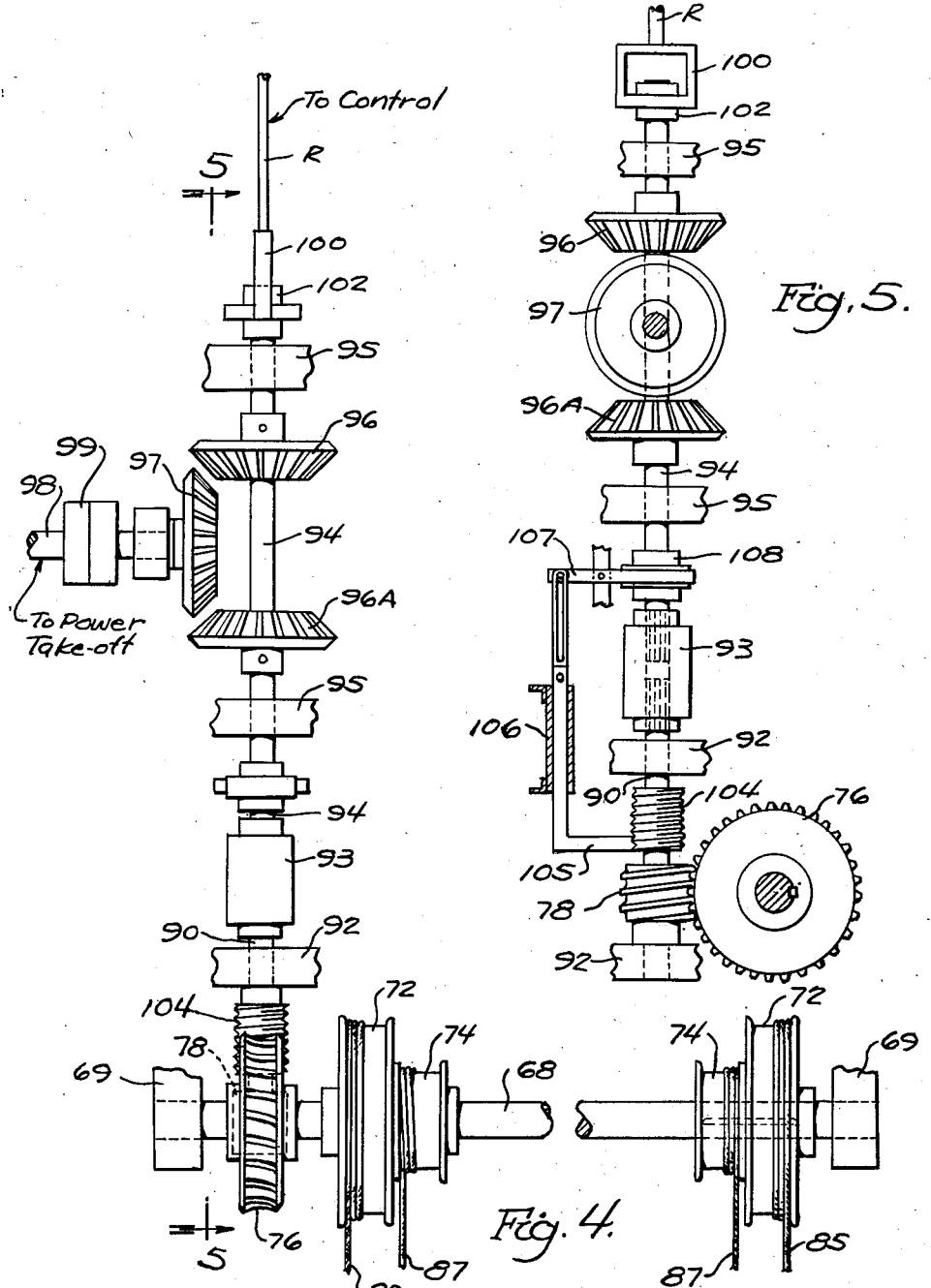

June 2, 1953  L. D. BARRY  2,640,612
PORTABLE HOIST

Filed May 26, 1949   6 Sheets-Sheet 4

INVENTOR.
Leonard D. Barry
BY
Barnes, Kisselle, Laughlin & Raisch
Attorneys.

June 2, 1953 L. D. BARRY 2,640,612
PORTABLE HOIST
Filed May 26, 1949 6 Sheets-Sheet 5

INVENTOR.
Leonard D. Barry
BY
Barnes, Kisselle, Laughlin & Raisch
Attorneys.

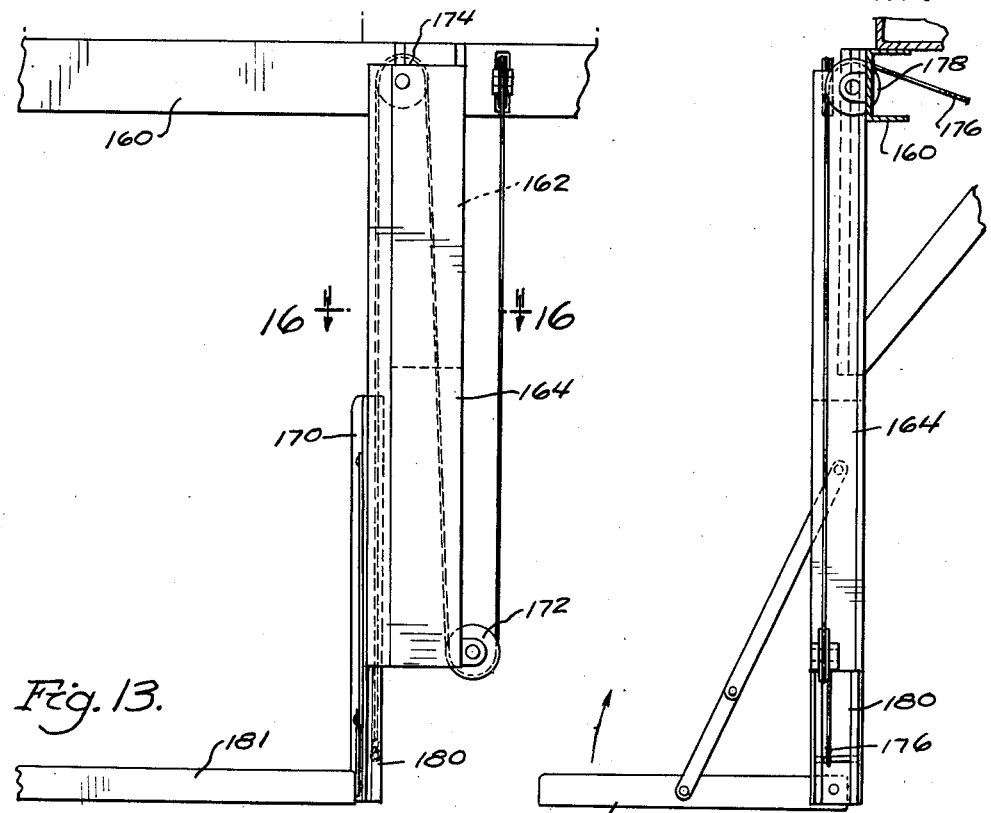

Patented June 2, 1953

2,640,612

UNITED STATES PATENT OFFICE 2,640,612

PORTABLE HOIST

Leonard D. Barry, Detroit, Mich.

Application May 26, 1949, Serial No. 95,477

13 Claims. (Cl. 214—75)

This invention relates to a portable hoist mechanism and has particularly to do with a hoisting mechanism to be applied to truck bodies and similar conveyances for shifting articles vertically to facilitate loading and unloading.

It is an object of the invention to provide a mechanical hoist which may be applied to the sides or rear of a truck body without materially altering the clearance of the truck body on which the hoist is mounted. It is a further object to provide a mechanically operated hoist which will shift loads through a maximum vertical distance relative to the hoist mechanism. Another object of the invention is directed to a safety control for the hoist which permits immediate stop and start at the will of the operator and which also limits the movement of the hoist to avoid breakage or injury.

Briefly, the invention consists of the telescope mounting of a plurality of slides, each of which is to be shifted at different rates so that the slides reach the fully telescoped position at the same time. In addition, the hoist mechanism to be disclosed includes a folding platform to co-operate with the slides and a novel method of power take-off adapted to the particular slide position.

Drawings accompany the specification and the various views thereof may be briefly described as:

Figure 1, a side view of the hoist in assembly as applied to a truck body.

Figure 2, a sectional view of the hoist on line 2—2 of Figure 1.

Figure 3, a view similar to Figure 2 showing the hoist at truck bed level.

Figure 4, a schematic view of the hoist drive take-off.

Figure 5, a schematic view of the hoist control limit mechanism.

Figure 6:
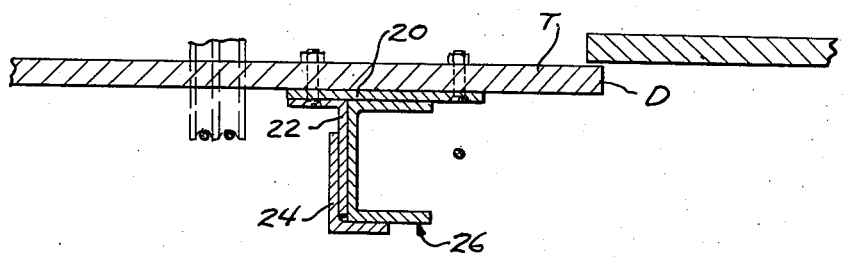

Figure 6, a horizontal section on line 6—6 of Figure 1.

Figure 7:
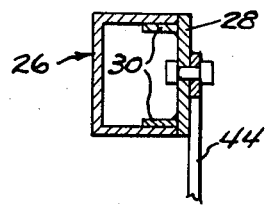

Figure 7, a sectional view of the hoist mechanism at line 7—7 of Figure 1.

Figure 8:
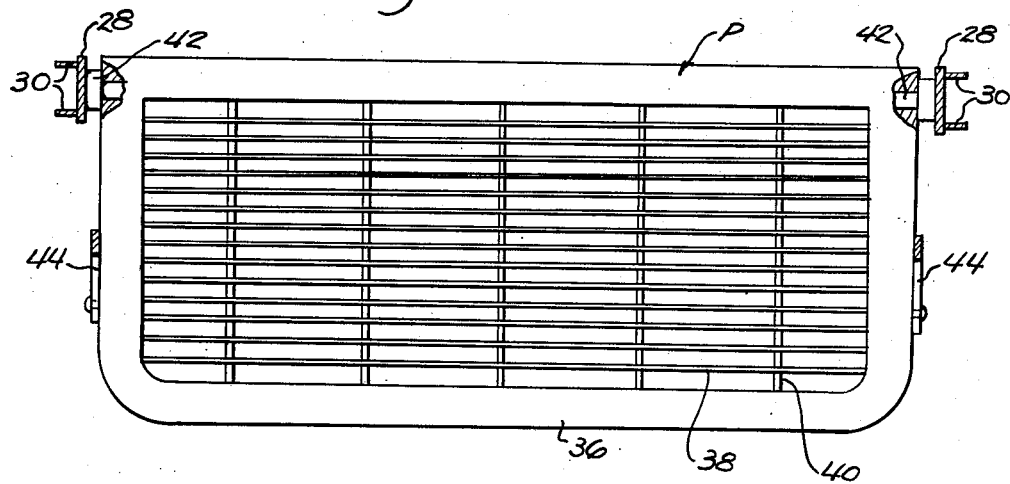

Figure 8, a plan view of the load platform of the hoist.

Figure 9:
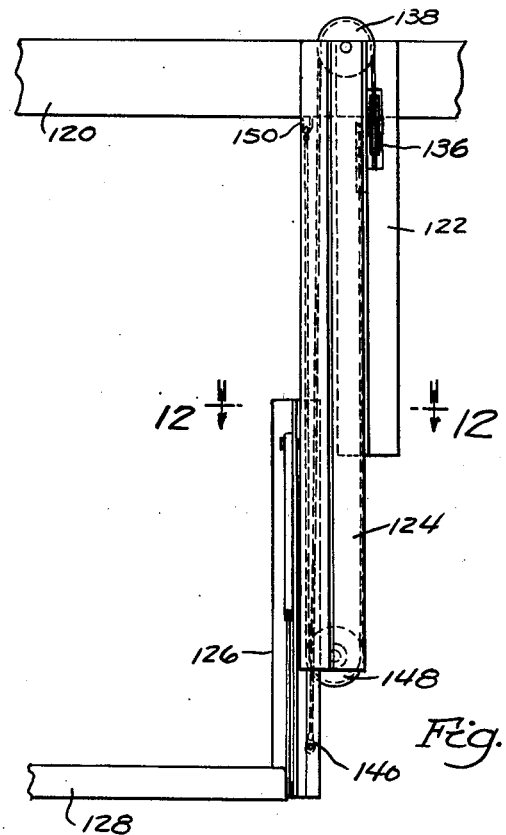
Figure 10:
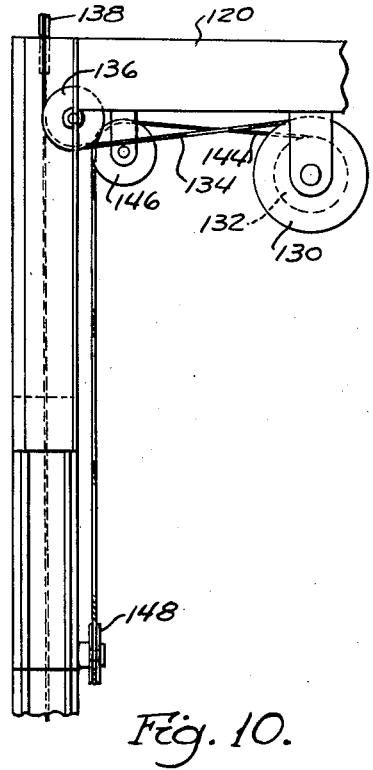
Figure 11:
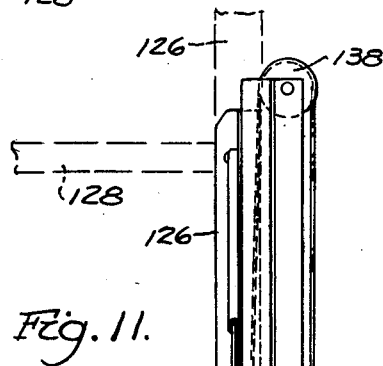

Figures 9, 10, and 11 illustrate respectively a front view, side view, and elevated view of a modified type of short hoist.

Figure 12:
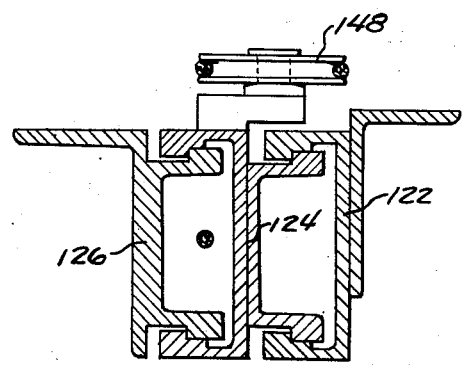

Figure 12 is a sectional view on line 12—12 of Figure 9.

Figures 13, 14, and 15 illustrate respectively a front view, side view, and elevated view of still another modification of hoist utilizing the same principles as the previous modifications.

Figure 16 is a sectional view on line 16—16 of Figure 13.

For purposes of illustration, the invention is shown applied to a truck body T mounted on a frame F and having a floor or bed B. An opening D is provided in the side wall of the truck body. The construction on either side of the door opening is symmetrical. A vertical plate 20 is secured to either side of the door. An L-shaped angle bar 22 is secured along the outer edge of each plate 20 with the longer leg of the L projecting outwardly normal to the plate 20. On the plate 22 are fastened at spaced intervals short L pieces 24, Figure 1 and Figure 6, which co-operate with the plates 20 and 22 to form a U-shaped groove to receive a U-shaped slide member 26. The slide member 26 in turn serves as a track for a slide plate 28 having legs 30 which project into the channel of the member 26.

In Figure 8 is found a plan view of the load platform P which has a solid outer frame 36 filled in by longitudinal grill members 38 transfixed by lateral grill members 40. At the inner corner of the platform P the slide members 28 are pivotally associated by a pivot member 42 secured to the slide member. A jackknife brace 44 connects the load platform with the slides 28 in such a manner that the platform may fold to a vertical position between the slides 28 as shown in Figure 3.

Hoist pulleys are provided at the top of plate members 20 supported by a bracket 50. As shown particularly in Figures 2 and 3 two pulleys of different diameters are provided, a large pulley 52 and a small pulley 54. Below the truck body end supported on the truck frame in a suitable bracket 56 is a shaft 58 having mounted thereon at each end two pulleys 62 and 64, each independently mounted on the shaft for individual rotation. If desired these pulleys may be mounted on short shafts independently mounted on either side. Parallel with shaft 58 but spaced inwardly from the side of the truck is a shaft 68 suitably mounted in bearing blocks 69 and having at each end thereof in substantial alignment with pulleys 62 and 64 pairs of pulleys 72 and 74, which pulleys are mounted for simultaneous rotation with the shaft 68 which is driven by a worm gear 76 and worm 78.

Connected to the slide 28 is a U-shaped fastener 80 which secures a cable 85 leading over pulleys 52 and down to pulley 62 and then to pulley 72 where the other end of the cable is affixed. Similarly, at the top of slide 26 a U-shaped fastener 86 connects a cable 87 which leads over pulley 54 and pulley 64 to the rotating drum pulley 74 where the other end is affixed.

The driving mechanism for shaft 68 and the drums 72 and 74 is shown in Figures 4 and 5.

The worm 78 is driven through a shaft 90, bearing in block 92, and connected by a slip joint 93 to an aligned shaft 94 journaled at 95. Shaft 94 is slidably mounted and supports bevel gears 96 which co-operate alternately with a bevel gear 97 on a power take-off shaft 98. A load relief clutch 99 is provided if desired. It will be seen that when gear 97 is rotating, the shifting of shaft 94 through yoke 100 rotating on collar 102 will engage either gear 96 or 96A to cause rotation of shaft 94 in one direction or the other.

Rotation of shaft 94 causes rotation of worm 78 and worm gear 76, thus transmitting rotation to the drum pulleys 72 and 74. Drum pulley 72 has a diameter twice as great as that of pulley 74, and since the circumference of a circle is directly proportional to the diameter, the rate of travel of the respective cables 85 and 87 will be proportional to the diameter. That is, cable 85 will feed in or out twice as fast as cable 87. Thus the slide 26 will rise half as fast as the slide 28. This is particularly evident in comparing Figures 2 and 3. Thus by manipulating a simple control rod R, an operator may cause the hoist to raise or lower at will. The worm and gear arrangement will prevent movement of the hoist except when power is applied. It will be understood that more than two movable slides could be used on each hoist arrangement and that the number of drive pulleys would correspond to the number of slides. Similarly the speed ratio of the respective pulleys may be varied.

In Figure 5, I have shown a simple mechanical limit switch wherein a threaded cylinder 104 is mounted on shaft 90 adjacent the worm 78. Co-operating with this threaded cylinder is an arm 105 slidably mounted in a bracket 106. Connected to the arm 105 is a lever 107 which yokes over a bushing 108 rotatably with shaft 94. Movement of the arm 105 causes the shifting of shaft 94, and after a predetermined rotation of shaft 94 the particular gear joint therewith is disengaged to prevent further movement.

Referring to Figure 9, a truck bed is shown at 120. Bolted to the truck bed is a short depending channel 122 having a sectional configuration as shown in Figure 12. Slidably engaged with this channel 122 is an intermediate section 124 interlocked with the channel 122. A third platform slide member 126 is slidably engaged and interlocked with the intermediate channel 124. A corresponding set of slide members would be mounted in opposed relation to the set just described to provide a symmetrical arrangement, a platform 128 being supported on the last slide member 126. The double-drive pulleys with related circumferential dimensions are shown at 130 and 132. The large pulley 130 winds a cable 134 which passes under a pulley 136 adjacent the truck bed 120 and over a pulley 138 on an axis at right angles to the pulley 136. The cable end passes downwardly to a fastening point 140 adjacent the bottom of the slide member 126.

The small pulley or power drum 132 has wound thereon a cable 144 which passes over a pulley 146 on the truck bed and under a pulley 148 on the intermediate member 124. The cable end passes upwardly to a fastening point 150 adjacent the truck bed. In operation, the unit shown in Figures 9, 10, and 11 functions in much the same way as the unit shown in Figures 1 to 8. Both the intermediate member 124 and the last platform slide 126 will rise until the platform 128 is level with the truck bed 120. The interlocking cross-section of the slides provides the stability required due to the short sections used. If desired, the platform 128 can be raised to points considerably higher than the truck bed 120.

The unit shown in Figures 13 to 15 varies somewhat in operation since it depends on a single cable operation. A truck bed 160 supports a short channel member 162 which is rigidly mounted on the truck bed or frame. An intermediate slide 164 has in cross-section L-shaped legs 165 which co-operate with flanges 166 providing interlocking slide members. On the side of channel 164 is mounted a second channel 168 which moves with the channel 164, the legs of the channel 168 having in cross-section inward extension flanges 169. A third platform slide member 170, having inwardly extending legs 171 co-operating with the flanges 169, is slidably mounted on the channel 168. On each end of intermediate slide 164 are mounted pulleys 172 and 174, these being offset horizontally so that a cable 176 coming from a power drum, not shown, can pass over a pulley 178 and then under pulley 172 and over pulley 174 after which it extends down to a fastening point 180 at the lower end of the slide 170 on which the hoist platform 181 is mounted. It will be noted that the cable 176 passes through a chamber 182 formed by a plate 184 closing the outside channel of slide 164. The cable also passes inside channels 168 and 170. Tension on the cable 176 will cause a lifting action on the two slide members 164 and 170. These parts are so arranged that the slide 164 may raise above the truck bed 160, and similarly the slide 170 supporting the platform 181 may lift the platform above the truck bed if it is desired to hoist a load above that point.

The interlocking section shown in Figure 16 provides a rigid structure with a very small overall length which gives a maximum lifting travel.

It will thus be seen that I have provided a truck hoist of simple mechanisms which can be applied very readily to the standard truck body with a relatively simple power take-off. The space required for mounting is relatively small.

The hoist is adaptable to vans and freight trucks where the loads carried are of a nature suited to such loading and unloading and such for milk can pickup, kegs, and the like. The moving slides can be single at each end of the platform, double, or of any number according to the heights and depths required and the length of the rigid track slide. The cables from one side of the hoist can be run over the top of the truck door when installed to this height and together with the cables of that side run to the same hoist drum effecting a saving of shafting and drums. The lift may be of any width designed to carry the load, it therefore can be wide enough to be placed on a truck side with the pulleys and vertical slides spaced far enough apart for the door or doors to swing out and up against the truck body where such doors are used. Then the platform can be made to clear the doors when the platform is in the horizontal position and can be raised and come as close to the truck entry as the other hoists. The platform can be folded up in front of the doors after they have been closed.

What I claim is:

1. A hoist mechanism for mounting on a portable body which comprises a pair of vertically disposed parallel spaced frame members, a guide track on each of said frame members, a first slide member to move vertically in said guide track, and one or more additional slide members mounted respectively on said first slide member and on each other to telescope vertically together, a hoist platform associated with a pair of said slide members, a plurality of cable drums, an individual cable suspending each of said slide members to a cable drum, power means for actuating said cable drums simultaneously said cable drums having different circumferences whereby the hoist platform is raised at a greater rate of speed than the first slide members and any intermediate slide members.

2. A hoist mechanism for mounting on a portable unit such as a truck which comprises two vertically disposed parallel spaced frame members, a track on each of said frame members, a first slide member on said track, a second slide member telescoping within said first slide member, a hoist platform pivotally mounted on said second slide member, arranged to fold into the space between the frame members, cable drums having different circumferences, means for simultaneously driving said cable drums, cable means connecting each said slide member to a said drum whereby said platform with said second slide members is raised at a greater rate of speed than said first slide members.

3. A hoist mechanism which consists of a series of telescoping slide members providing a plurality of relative movements, a plurality of power-driven cable drums, each associated with a slide member and each having a circumference proportional to the speed of the slide member and cables running from said drums to said slide members and in which the drums are mounted on a single shaft driven by a worm and gear mechanism, a power means for operating said worm and gear mechanism, and mechanical switch means for disconnecting said power means at the upper and lower limits of travel of the slide members.

4. A truck or trailer side or back vertical cable hoist capable of being raised to points above the truck bed as well as to points at and below the truck bed and capable of being stopped and held at any point within its range which comprises a stationary vertically disposed track mounted below truck bed level, an intermediate slide of greater length than said track, a load-bearing slide, each of said slides being positioned for relative vertical movement with respect to its neighbor, a friction removing, direction changing unit at each end of said intermediate slide and a cable anchored at one end of said platform slide passing over said friction removing units to a power drum for shortening the cable to cause relative vertical movement of the slide members, said slide members being extended at extremes of travel and telescoped in intermediate positions.

5. A cable operated hoist mechanism which comprises two vertically disposed parallel frame members each having a guideway thereon oppositely facing each other, a plurality of telescoping guide members mounted on each said frame member for vertical movement and extending inward of said guideway toward the opposite guideway, a load carrier pivotally attached between a pair of said guide members in the plane thereof, said load carrier being rotatable from a substantially horizontal position to a position between and in a plane common to said guide members.

6. A cable hoist which comprises two vertically disposed guide frame members suitable for mounting to the outside of an enclosed truck body side one on each side of an opening and facing each other, a first pair of guide members facing each other and interlocked each with said guide frame for vertical movement, a second pair of guide members facing each other and interlocked each with a said first guide member, a platform pivotally attached at the ends to said second pair of guide members near the bottoms thereof and in a plane common to the guide members so as to permit movement of the platform between substantially horizontal and vertical position for clearance, said platform being supported in horizontal position by bracing to said second guide, cables for operating said guides individually, means for operating said cables whereby the first pair of guides are hoisted at a slower speed than the second pair of guides.

7. A cable hoist as claimed in claim 6 in which the cables are operated over pulleys mounted above said guides in substantially the plane of the guide members.

8. A hoist mechanism which comprises a series of telescoping members providing a plurality of relative movements therebetween, a plurality of cable drums having different circumferences mounted on a shaft to rotate together, means for rotating and otherwise holding against inadvertent rotation said cable drums, a different cable connecting each said telescoping member with a said cable drum whereby the actuating speeds of said telescoping members are proportional to the length wherein the members are fully telescoped at one point and fully extended at another point in the movement thereof.

9. A hoist mechanism suitable for mounting on a portable unit such as a truck which comprises vertically disposed parallel spaced frame members, a plurality of telescoping members on each said frame member, said telescoping members having progressively different lengths of vertical movement, the ones having least vertical movement being slidable on the frame members, a load platform supported between telescoping members which have substantially equal vertical movement and are mounted on other telescoping members, a plurality of power driven cable drums, a different cable connecting each said telescoping member with a said cable drum having a circumference proportional to the distance traveled by the telescoping member between the extremes of travel, a shaft having said drums mounted thereon to prevent turning with respect thereto, a worm and gear mechanism for driving said shaft, power means for operating said worm and gear mechanism, automatic switch means for disconnecting said power means at the upper and lower limits of travel of the telescoping members, and manual control for disconnecting said power means from said worm and gear mechanism.

10. In a portable hoist, a series of telescoping members each of which is mounted for individual actuation, a substantially rigid reeling means having different circumferences, a flexible connection from each said telescoping member to a portion of said reeling means having a different circumference whereby the revolving of said reeling means actuates said telescoping members at relative velocities in the ratio of the different circumferences.

11. A truck or trailer side or back platform hoist which comprises, two vertically disposed and parallel spaced stationary guide members mounted below vehicle bed level, two intermediate guides of greater length than said stationary guide interlocked for vertical telescoping movement each with a stationary guide, two load bearing guides interlocked for telescoping each with a said intermediate guide, said guides lying in a common plane, a load platform, means pivotally attaching said platform to and between said load bearing guides in a plane thereof, said load platform being rotatable from a substantially horizontal position to a position between and in a plane common to said guide members, cable and cable drum means for suspending and providing relative movement between said telescoping guides, and friction removing direction changing units at each end of said intermediate guides around which said cable means is operated.

12. A hoist for mounting to a truck or trailer which comprises; two vertically disposed parallel frame members mounted below vehicle bed level each having a guideway thereon, two intermediate guides telescoped for vertical movement each with a said stationary guide, two load bearing guides telescoped each with a said intermediate guide, a load carrier pivotally attached to said load bearing guides, said load carrier being rotatable from substantially horizontal to vertical positions, power drum means, cables suspending said guides to said power drum means for actuating said guides within limits of travel, said guides being extended at limits of travel and telescoped in intermediate positions.

13. A hoist mechanism which comprises; a first frame member; a guideway thereon; a first series of guides mounted, the first on said guideway, and then one on the other from the first in series upward; a second frame member; a second series of guides mounted as described for said first series; all guides lying in substantially the same plane; both said series of guides mounted substantially vertically for vertical telescoping and in series progressing toward the opposite series; a load carrier pivoted between said guides highest in series; and means for actuating said guides individually at an independently established speed ratio comprising, cables and cable drums therewith associated, said drums having different circumferences driven at the same speed, the speed ratio desired between guides being established by selecting drums having the proper circumference.

LEONARD D. BARRY.

References Cited in the file of this patent

UNITED STATES PATENTS

| Number | Name | Date |
|---|---|---|
| 301,863 | Cheney | July 15, 1884 |
| 1,676,449 | Lederer | July 10, 1928 |
| 1,910,364 | Remde | May 23, 1933 |
| 1,917,621 | Weber | July 11, 1933 |
| 1,924,751 | Porter | Aug. 29, 1933 |
| 2,151,338 | Shonnard | Mar. 21, 1939 |
| 2,387,693 | Trevino | Oct. 23, 1945 |
| 2,456,320 | Repke | Dec. 14, 1948 |
| 2,505,009 | Schroeder | Apr. 25, 1950 |
| 2,514,052 | Gunning | July 4, 1950 |
| 2,521,727 | Kappen | Sept. 12, 1950 |
| 2,530,341 | Satsky | Nov. 14, 1950 |

FOREIGN PATENTS

| Number | Country | Date |
|---|---|---|
| 486,962 | Great Britain | June 14, 1938 |